(12) United States Patent
Nguyen et al.

(10) Patent No.: US 10,394,640 B2
(45) Date of Patent: Aug. 27, 2019

(54) REQUIREMENT RUNTIME MONITOR USING TEMPORAL LOGIC OR A REGULAR EXPRESSION

(71) Applicant: Infineon Technologies Austria AG, Villach (AT)

(72) Inventors: Dinh Quoc Thang Nguyen, Villach (AT); Udo Hafner, Villach (AT); Christian Reidl, Villach (AT)

(73) Assignee: Infineon Technologies Austria AG, Villach (AT)

( * ) Notice: Subject to any disclaimer, the term of this patent is extended or adjusted under 35 U.S.C. 154(b) by 149 days.

(21) Appl. No.: 15/423,100

(22) Filed: Feb. 2, 2017

(65) Prior Publication Data

US 2017/0249202 A1  Aug. 31, 2017

Related U.S. Application Data

(60) Provisional application No. 62/299,748, filed on Feb. 25, 2016.

(51) Int. Cl.
*G06F 11/07* (2006.01)
*G06F 11/30* (2006.01)

(52) U.S. Cl.
CPC ........ *G06F 11/079* (2013.01); *G06F 11/0706* (2013.01); *G06F 11/0754* (2013.01); *G06F 11/30* (2013.01)

(58) Field of Classification Search
CPC .............................. G06F 11/07; G06F 11/079
USPC ........................................................... 714/39
See application file for complete search history.

(56) References Cited

U.S. PATENT DOCUMENTS

| 2004/0059867 | A1* | 3/2004 | Heinemann | G05B 19/042 711/112 |
| 2008/0320486 | A1* | 12/2008 | Bose | G06Q 10/06 718/105 |
| 2015/0269383 | A1* | 9/2015 | Lang | G06F 21/57 726/1 |
| 2018/0031587 | A1* | 2/2018 | Bierweiler | G01N 35/00584 |
| 2018/0204002 | A1* | 7/2018 | Khorrami | G06F 21/566 |

* cited by examiner

*Primary Examiner* — Kamini B Patel
(74) *Attorney, Agent, or Firm* — Harrity & Harrity, LLP (57) ABSTRACT

A hardware monitor may receive information that identifies a requirement for a system. The requirement may be associated with operation of the system during a runtime operation of the system in an intended operating environment. The hardware monitor may program the one or more hardware components to analyze the system based on the requirement. The hardware monitor may receive a signal from the system during the runtime operation of the system in the intended operating environment. The hardware monitor may analyze the signal during the runtime operation of the system based on the requirement. The hardware monitor may determine, during the runtime operation of the system, that the requirement was violated during the runtime operation of the system based on analyzing the signal. The hardware monitor may output information indicating that the requirement was violated.

20 Claims, 6 Drawing Sheets

REQUIREMENT RUNTIME MONITOR USING TEMPORAL LOGIC OR A REGULAR EXPRESSION

RELATED APPLICATION

This application claims priority under 35 U.S.C. § 119 to U.S. Provisional Patent Application No. 62/299,748, filed on Feb. 25, 2016, the content of which is incorporated by reference herein in its entirety.

BACKGROUND

Temporal logic or time regular expression may refer to a system of rules and symbolism for representing and reasoning about propositions qualified in terms of time. Temporal logic or time regular expression may be used in formal verification, and may be used to state requirements of hardware and/or software systems.

SUMMARY

In some implementations, a hardware monitor may include one or more hardware components. The one or more hardware components may receive information that identifies a requirement for a system. The requirement may be associated with operation of the system during a runtime operation of the system in an intended operating environment. The one or more hardware components may program the one or more hardware components to analyze the system based on the requirement. The one or more hardware components may receive a signal from the system during the runtime operation of the system in the intended operating environment. The one or more hardware components may analyze the signal during the runtime operation of the system based on the requirement. The one or more hardware components may determine, during the runtime operation of the system, that the requirement was violated during the runtime operation of the system based on analyzing the signal. The one or more hardware components may output information indicating that the requirement was violated.

In some implementations, a runtime monitor may include a memory and one or more processors. The one or more processors may receive information that identifies an intermediate time-based representation that expresses a requirement for a system. The requirement may be associated with operation of the system during a runtime operation of the system in an intended operating environment. The one or more processors may store the requirement in the memory as code that represents the requirement. The one or more processors may receive a signal from the system during the runtime operation of the system. The one or more processors may analyze the signal during the runtime operation of the system using the stored requirement. The one or more processors may determine, during the runtime operation of the system, that the requirement was violated during the runtime operation of the system based on analyzing the signal. The one or more processors may output information indicating that the requirement was violated.

In some implementations, a method may include receiving, by a hardware monitor, information that identifies a requirement for a system. The requirement may be associated with operation of the system during a runtime operation of the system in an intended operating environment. The requirement may be translated from temporal logic or a time regular expression to code implemented on the hardware monitor. The method may include monitoring, by the hardware monitor, a signal from the system during the runtime operation of the system. The method may include analyzing, by the hardware monitor, the signal during the runtime operation of the system using the requirement. The method may include determining, by the hardware monitor and during the runtime operation, that the requirement was violated during the runtime operation of the system based on analyzing the signal. The method may include outputting, by the hardware monitor, information indicating that the requirement was violated.

DETAILED DESCRIPTION

The following detailed description of example implementations refers to the accompanying drawings. The same reference numbers in different drawings may identify the same or similar elements.

Observation and/or detection of satisfaction or violation of a requirement of a system may be carried out via simulation and/or lab measurements at one or more levels of design, such as a level of design associated with a Tier-2 supplier, a Tier-1 supplier, and/or an original equipment manufacturer (OEM). When using a simulation approach, a model of the system may be idealized and/or highly detailed, which may impact performance of the simulation and may result in an error associated with monitoring of the requirement. Similar errors may occur when using a lab measurement approach. Furthermore, once a requirement is deemed violated, a causality analysis (e.g., a root-cause analysis), associated with identifying a reason for the violation, may require significant resources (e.g., time, effort, processing resources, memory resources, network resources, etc.). Furthermore, these approaches may have low reusability, and a different simulation and/or a different lab measurement setup may need to be created for each different system.

Implementations described herein may provide a runtime monitor (sometimes referred to as a hardware monitor) capable of observing and/or detecting whether a requirement of a system is satisfied or violated during runtime of the system. The runtime monitor may enable automated testing and/or validation of the system, and may support early integration and/or validation of the system (e.g., at a Tier-1 supplier, an OEM, etc.). In some implementations, the runtime monitor may include a causality analysis component capable of identifying a reason for a violation of the requirement and generating a log file associated with one or more violations of the requirement.

In some cases, a requirement of a system may be written using natural language. To prepare the requirement for use by the runtime monitor, the natural language requirement may be formalized using a time-based intermediate representation, such as a regular expression (e.g., a time regular expression), one or more types of temporal logic (TL) (e.g., metric TL (MTL), linear TL (LTL), signal TL (STL), etc.), and/or the like. A time-based intermediate representation may use a syntax to represent a requirement in terms of time. Since the requirement is formalized based on particular and/or rigorous semantics associated with the TL type, ambiguities of the requirement may be reduced and/or removed. The formalized requirement may then be synthesized and implemented in the runtime monitor. The runtime monitor may include a hardware platform with one or more target devices (e.g., a field-programmable gate array (FPGA)) providing capabilities of monitoring a runtime signal and evaluating the correctness of the runtime signal against the synthesized requirement. In this way, the system may be more accurately monitored, and may be monitored during runtime.

Figure 1:
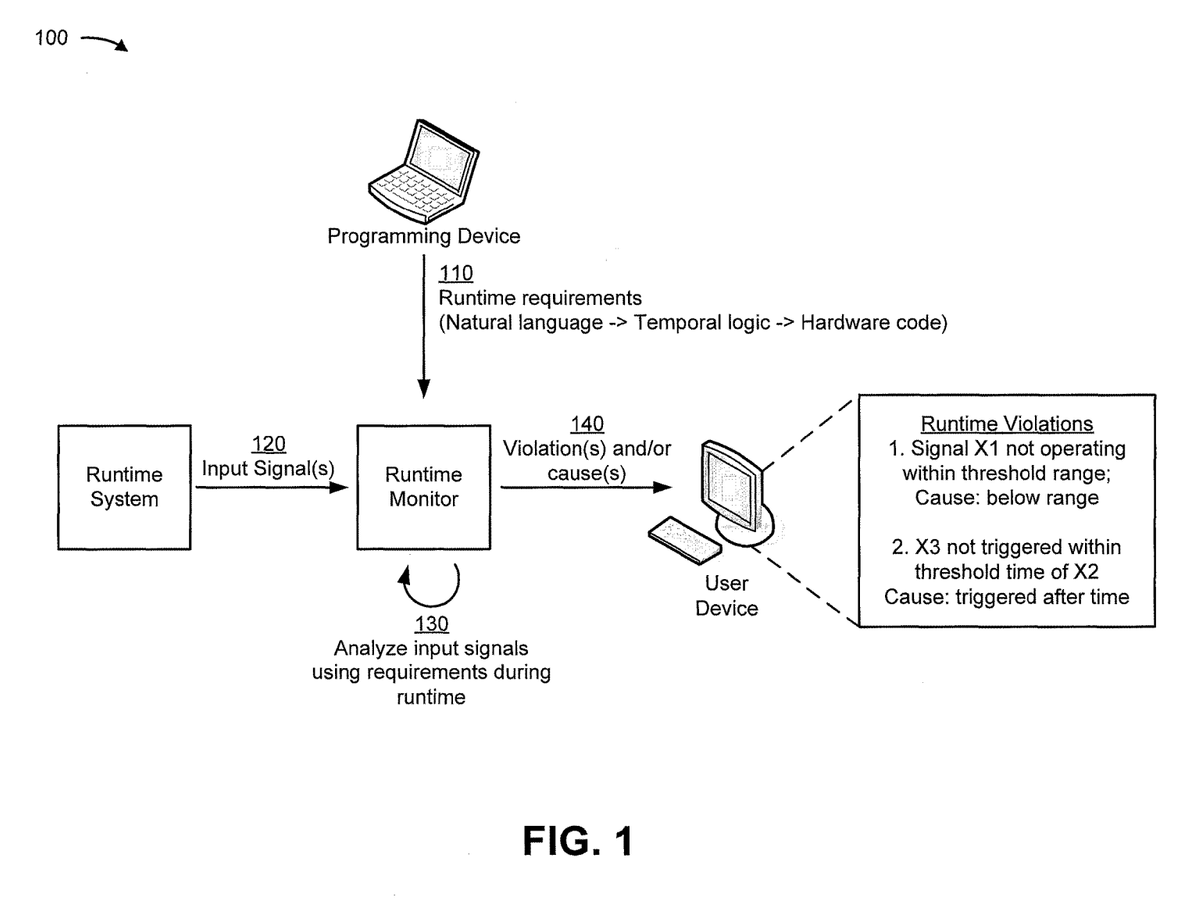
FIG. 1 is a diagram of an overview of an example implementation described herein.

FIG. 1 is a diagram of an overview of an example implementation 100 described herein. As shown in FIG. 1, and by reference number 110, a runtime monitor may receive runtime requirements associated with a runtime system (sometimes referred to herein as a system). The runtime requirements may be received from a programming device used to program one or more components of the runtime monitor. In some implementations, the requirements may be expressed using natural language, and may be translated from natural language to a time-based intermediate representation (e.g., based on user input and/or natural language processing), such as temporal logic or time regular expression. The time-based intermediate representation may be translated into hardware code, which may be implemented in the runtime monitor (e.g., using one or more FPGAs and/or other types of processors). In some implementations, such translation to hardware code may be performed using the programming device, and the hardware code may be provided to the runtime monitor. Additionally, or alternatively, such translation may be performed by the runtime monitor.

As shown by reference number 120, the runtime monitor may receive one or more runtime signals from the runtime system. The runtime signal(s) may be received while the runtime system is operating (e.g., in a target environment, such as a vehicle), and may include analog signals, digital signals, physical signals, data determined based on physical signals, and/or the like. As shown by reference number 130, the runtime monitor may analyze the input signal(s) using the runtime requirement(s). Such analysis may be performed during runtime of the runtime system in an operating environment (e.g., as opposed to during design time of the runtime system). Additionally, or alternatively, the runtime monitor may perform a causality analysis to determine a cause of a requirement violation. In this way, requirement violations that occur during runtime of the runtime system can be detected, reported, and/or resolved.

As shown by reference number 140, the runtime monitor may output an indication of the runtime violation(s) and/or the cause(s) of the runtime violation(s). In some implementations, the indication(s) may be provided to a user device, which may output the indications via a user interface. Additionally, or alternatively, the indication(s) may be provided to external equipment (e.g., lab equipment), to another component in the runtime system being evaluated, to another component of the runtime monitor (e.g., to a warning light on the runtime monitor), and/or the like. For example, a first violation may indicate that a signal X1 is not operating within a threshold range indicated by a requirement, and a first cause may indicate that the signal X1 is below the range. Additionally, or alternatively, a second violation may indicate that a signal X3 is not triggered within a threshold time of a signal X2, and a second cause may indicate that the signal X3 is triggered after the threshold time. Additionally, or alternatively, the runtime monitor may take an action to control the runtime system to counteract the violation, thereby improving system performance and mitigating system errors.

By monitoring the runtime system during runtime, the runtime monitor is capable of detecting and/or reporting requirement violations that occur during runtime of the system. Because the requirements are translated from natural language to hardware code (or other code capable of being executed by the runtime monitor), the runtime monitor may be capable of quickly performing a requirement analysis so that violations can be reported in real time or near real time. This is particularly helpful for safety-critical systems, such as vehicle systems, health systems, etc., where potentially life-threatening violations can be reported and/or corrected in time.

As indicated above, FIG. 1 is provided as an example. Other examples are possible and may differ from what was described with regard to FIG. 1.

Figure 2:
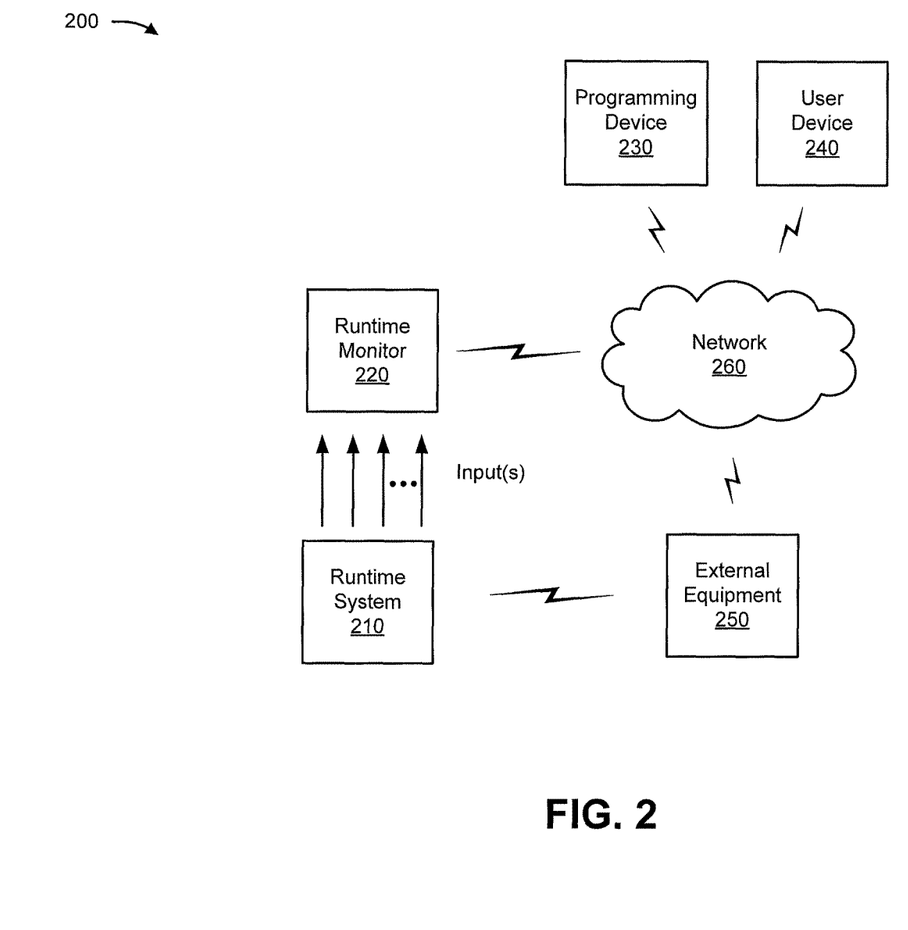
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a runtime system 210, a runtime monitor 220, a programming device 230, a user device 240, external equipment 250, and/or a network 260. Devices of environment 200 may interconnect via wired connections, wireless connections, or a combination of wired and wireless connections.

Runtime system 210 may include one or more hardware components, one or more software modules, and/or one or more interfaces between components (e.g., between two or more hardware components, two or more software modules, or a combination of hardware components and software modules). As an example, a component of runtime system 210 may include one or more sensors, electronic control units, transceivers, processors (e.g., FPGAs, application specific integrated circuits (ASICs), microcontrollers, digital signal processors (DSPs), microprocessors, etc.), integrated circuits, actuators, and/or the like. Additionally, or alternatively, an interface of runtime system 210 may include a controller area network (CAN) interface, a local interconnected network (LIN) interface, a FlexRay interface, an inter-integrated circuit (I2C) interface, a single edge nibble transmission (SENT) interface, a statistical process control (SPC) interface, a 1-wire interface, a pulse-width modulation (PWM) interface, a serial inspection and configuration interface (SICI), a media oriented system transport (MOST) interface, or another type of communication interface. The components and/or interfaces of runtime system 210 may operate during a runtime to receive input signals and/or provide output signals.

Runtime system 210 may include, for example, an automotive system, a semiconductor system, an electronic system, a health care system, an avionic system, a vehicle system, a railway system, and/or the like. Safety may be critical in such systems, and runtime monitor 220 may monitor such systems to detect faults in real time or near real time (i.e., as the faults occur).

Runtime monitor 220 includes one or more components to monitor runtime system 210 and/or detect requirement violations during a runtime operation of runtime system 210. For example, runtime monitor 220 may include a requirements runtime monitor component and/or a causality analysis component, as described below in connection with FIG. 3. Signals of runtime system 210 may be monitored by runtime monitor 220 during a runtime operation of runtime system 210 in an intended operating environment of runtime system 210 (e.g., during operation of a sensor of a vehicle as the vehicle is operated by a driver). In some implementations, runtime monitor 220 may monitor a stand-alone runtime system 210 that includes a single hardware component. In some implementations, runtime monitor 220 may monitor a distributed runtime system 210 that includes multiple hardware components.

In some implementations, runtime system 210 and runtime monitor 220 may be integrated within the same hardware to increase a processing speed of monitoring runtime system 210. Additionally, or alternatively, multiple low-level runtime monitors 220 may monitor different components of runtime system 210. In some implementations, one or more high-level runtime monitors 220 may monitor the low-level runtime monitors 220 to gather multiple inputs for analysis. This may be referred to as distributed monitoring. In some implementations, runtime monitor 220 may be implemented in a FPGA and one or more analog front end circuits (e.g., one or more analog to digital convertors (ADCs)) capable of sampling and/or buffering one or more runtime signals from runtime system 210. Additionally, or alternatively, runtime monitor 220 may be implemented in an embedded system including one or more processors (e.g., one or more microcontrollers, ASICs, microprocessors and/or the like) and/or one or more peripheral devices.

Programming device 230 includes one or more computing devices capable of providing requirement information and/or requirement code to runtime monitor 220. For example, programming device 230 may include a laptop computer, a desktop computer, a server, a tablet computer, a mobile phone, and/or the like. In some implementations, natural language requirements may be translated to a time-based intermediate representation (e.g., temporal logic, a time regular expression, etc.) using programming device 230. Additionally, or alternatively, the time-based intermediate representation may be translated to code using programming device 230. Programming device 230 may provide the code to runtime monitor 220 to program one or more components (e.g., processor(s)) of runtime monitor 220 with the code for analyzing the requirements. In this way, runtime monitor 220 may be capable of monitoring different types of runtime systems 210, and may be programmed to handle a particular type of runtime system 210 using the code, thereby reducing costs by developing a single programmable runtime monitor rather than specifics runtime monitors for handling specific types of runtime systems. Additionally, or alternatively, programming device 230 may provide the natural language requirements and/or the time-based intermediate representation to runtime monitor 220, and runtime monitor 220 may translate this information to code.

User device 240 includes one or more computing devices capable of communicating with runtime monitor 220. For example, user device 240 may include a laptop computer, a desktop computer, a server, a tablet computer, a mobile phone, and/or the like. In some implementations, runtime monitor 220 may provide an output of analyzing requirements of runtime system 210, during runtime, to user device 240. For example, runtime monitor 220 may provide an indication of one or more violated requirements and/or a cause of one or more violations. User device 240 may provide such indication(s) for display (e.g., via a user interface) or another type of output component.

External equipment 250 includes one or more devices capable of communicating with runtime system 210 based on information received from runtime monitor 220. For example, external equipment 250 may include monitoring equipment capable of monitoring runtime system 210 (e.g., an oscilloscope and/or the like), control equipment capable of controlling runtime system 210 (e.g., a voltage supplier, a signal generator, etc.), and/or the like.

Network 260 includes one or more wired and/or wireless networks. For example, network 260 may include a local area network (LAN), a cellular network, a public land mobile network (PLMN), a wireless local area network (e.g., a Wi-Fi network), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
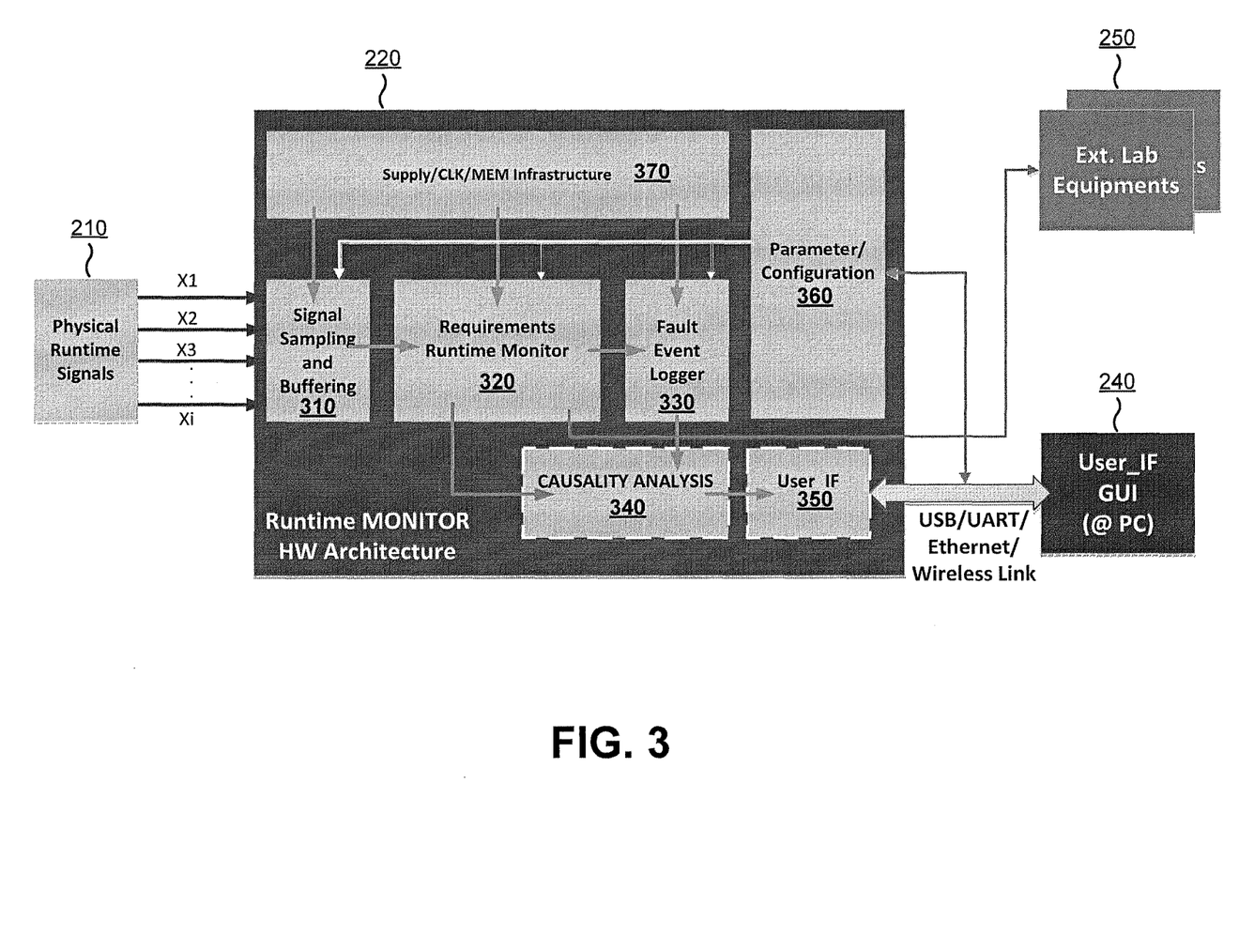
FIG. 3 is a diagram of example components of a runtime monitor shown in FIG. 2.

FIG. 3 is a diagram of example components of runtime monitor 220. As shown in FIG. 3, runtime monitor 220 may include a signal sampling and buffering component 310, a requirements runtime monitor component 320, a fault event logger 330, a causality analysis component 340, a user interface component 350, a parameter/configuration component 360, and/or an infrastructure component 370. In some implementations, signal sampling and buffering component 310, requirements runtime monitor component 320, fault event logger 330, causality analysis component 340, user interface component 350, parameter/configuration component 360, and infrastructure component 370 are implemented in hardware (e.g., a processor, such as an FPGA, an ASIC, a microcontroller, etc.), firmware, or a combination of hardware and software.

Signal sampling and buffering component 310 may receive one or more runtime signals (shown as X1, X2, X3, . . . , Xi) from runtime system 210, and may sample and/or buffer the signals for processing by requirements runtime monitor component 320. Requirements runtime monitor component 320 may analyze the signals using code generated from one or more requirements, as described elsewhere herein. In some implementations, the processing speed of requirements runtime monitor component 320 may be faster than (e.g., twice as fast as, three times as fast as, etc.) the rate at which signals are sampled by signal sampling and buffering component 310, thereby allowing real-time analysis of the signals during runtime.

When requirements runtime monitor component 320 detects a violation of a requirement, requirements runtime monitor component 320 may provide information that identifies the violation to fault event logger 330. Fault event logger 330 may store log information that identifies runtime requirements violations. Additionally, or alternatively, fault event logger 330 may log information relating to a state of runtime system 210 before the fault occurs (e.g., a threshold time before the fault occurs), when the fault occurs, and/or after the fault occurs (e.g., a threshold time after the fault occurs). Fault event logger 330 may provide such log information to causality analysis component 340, which may use this log information to identify a cause of the violation.

In some implementations, requirements runtime monitor component 320 and/or fault event logger 330 may provide information associated with the violation to causality analysis component 340. Causality analysis component 340 may analyze the information to determine a cause of the violation, and may provide information that identifies the cause to user interface component 350. Additionally, or alternatively, requirements runtime monitor component 320 and/or fault event logger 330 may provide information associated with the violation to user interface component 350. User interface component 350 may provide such information for display (e.g., via a display component of runtime monitor 220, if applicable) and/or may provide such information to user device 240 for display via a user interface of user device 240. Additionally, or alternatively, requirements runtime monitor component 320, fault event logger 330, and/or causality analysis component 340 may provide information associated with a requirement violation to external equipment 250, and external equipment 250 may monitor and/or control runtime system 210 based on such information.

Parameter/configuration component 360 may receive (e.g., from user device 240 and/or programming device 230) configuration information for configuring (e.g., initially configuring or reconfiguring) one or more components of runtime monitor 220. For example, parameter/configuration component 360 may receive and/or process a requirement in the form of natural language, a time-based intermediate representation (e.g., temporal logic, a time regular expression, etc.), and/or code, and may configure requirements runtime monitor component 320 based on the requirement. Additionally, or alternatively, parameter/configuration component 360 may configure signal sampling and buffering component 310 (e.g., may configure a sampling rate, a buffer size, etc.), fault event logger 330 (e.g., with a threshold time for determining a state of runtime system 210 prior to, during, and/or after a fault), and/or causality analysis component 340 (e.g., a manner in which to determine a cause of a violation).

Infrastructure component 370 includes one or more components that support other components of runtime monitor 220, such as processing components, memory components, clock components, power supply components, and/or the like.

The number and arrangement of components shown in FIG. 3 are provided as an example. In practice, runtime monitor 220 may include additional components, fewer components, different components, or differently arranged components than those shown in FIG. 3. Additionally, or alternatively, a set of components (e.g., one or more components) of runtime monitor 220 may perform one or more functions described as being performed by another set of components of runtime monitor 220.

Figure 4:
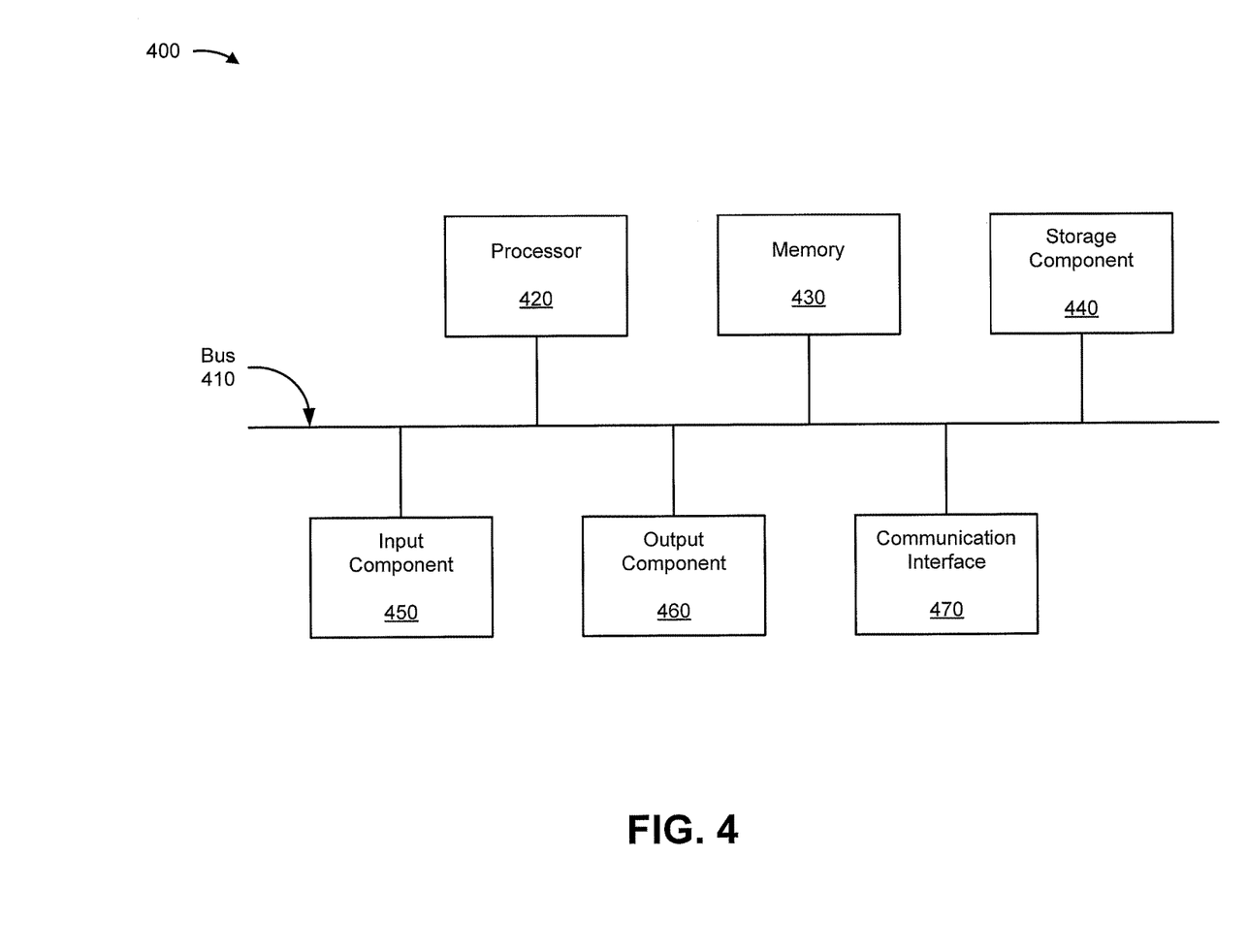
FIG. 4 is a diagram of example components of one or more devices of FIG. 2.

FIG. 4 is a diagram of example components of a device 400. Device 400 may correspond to runtime system 210, runtime monitor 220 (e.g., one or more components of runtime monitor 220, as described above in connection with FIG. 3), programming device 230, user device 240, and/or external equipment 250. In some implementations, runtime system 210, runtime monitor 220 (e.g., one or more components of runtime monitor 220, as described above in connection with FIG. 3), programming device 230, user device 240, and/or external equipment 250 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
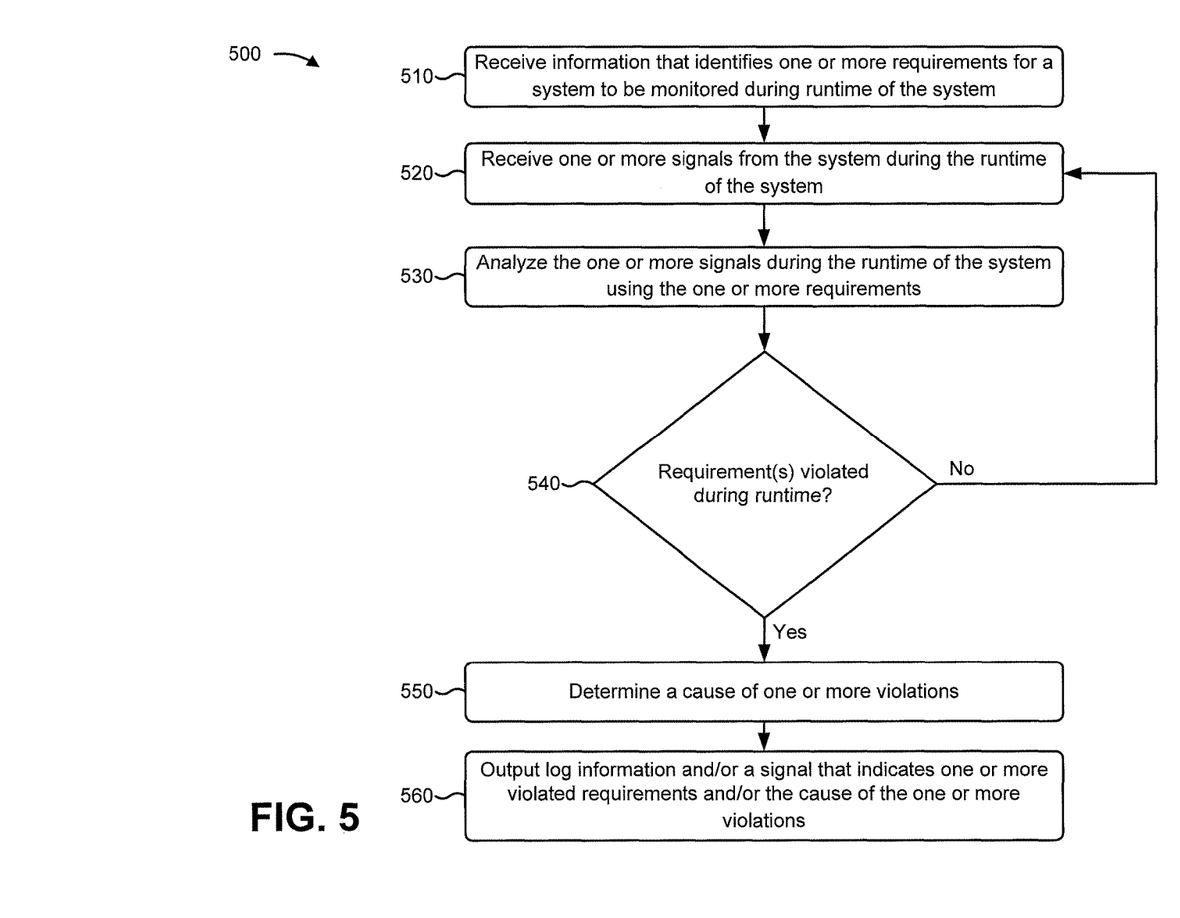
FIG. 5 is a flow chart of an example process for implementing a requirement runtime monitor.

FIG. 5 is a flow chart of an example process 500 for implementing a requirement runtime monitor. In some implementations, one or more process blocks of FIG. 5 may be performed by runtime monitor 220. In some implementations, one or more process blocks of FIG. 5 may be performed by another device or a group of devices separate from or including runtime monitor 220, such as runtime system 210, programming device 230, user device 240, and/or external equipment 250.

As shown in FIG. 5, process 500 may include receiving information that identifies one or more requirements for a system to be monitored during a runtime operation of the system (block 510). For example, runtime system 210 may be associate with one or more requirements relating to operation of runtime system 210 during a runtime operation in an intended environment of runtime system 210. For example, a requirement may relate to one or more hardware components of runtime system 210, one or more software modules of runtime system 210, and/or one or more interfaces of runtime system 210.

In some implementations, a requirement may be input (e.g., to programming device 230 and/or runtime monitor 220) using natural language, and may be translated to syntax of a time-based intermediate representation (e.g., a temporal logic syntax, a time regular expression, etc.). In some implementations, the time-based intermediate representation may be input be a user. Additionally, or alternatively, the time-based intermediate representation may be derived from natural language requirements using natural language processing. The time-based intermediate representation may be translated to code, such as hardware description language (HDL) code, register transfer level (RTL) code, very high speed integrated circuit (VHSIC) hardware description language (VHDL) code, Verilog code, C code, C++ code, SystemC code, and/or the like.

A time-based intermediate representation (e.g., temporal logic, a time regular expression, etc.) may include a future operator associated with a future event and a past operator associated with a past event. In some implementations, when a time-based intermediate representation (e.g., a temporal logic formula, a time regular expression, etc.) includes one or more future operators, the formula may be converted to a formula that contains only past operators. Such conversion may permit runtime monitor 220 to analyze requirements (e.g., runtime monitor 220 may not be able to predict an endless future event because hardware usually has limited computational and memory resources).

In some implementations, a requirement may include a requirement for an operating range of a signal (e.g., signal X1 shall operate within a parameter threshold). Additionally, or alternatively, a requirement may include a dependency-based requirement (e.g., when X2 is triggered, X3 shall be triggered within the next Y clock cycles). Additionally, or alternatively, a requirement may include a time-based requirement (e.g., if a request occurs, acknowledgement must be detected not earlier than the next X clock cycles and not later than Y clock cycles).

In some implementations, a requirement may include a requirement for an electrical interface, such as a requirement for a voltage fall time to be within a threshold amount of time (e.g., the fall time from V1 to V2 shall be t1 microseconds), a requirement for a voltage rise time to be within a threshold amount of time (e.g., the rise time from V2 to V1 shall be t2 microseconds), a requirement for a signal stabilization time (e.g., the signal stabilization time below low threshold V1 or above high threshold V2 shall be a minimum of t3 microseconds), and/or the like.

Additionally, or alternatively, a requirement may include a requirement for a transmission property of a synchronization pulse, such as a requirement for a length of time of a synchronization pulse (e.g., the synchronization pulse shall have a nominal period of X clock cycles), a requirement for a manner in which clock ticks of a synchronization pulse are to be driven (e.g., X clock cycles of the synchronization pulse shall be driven low, all remaining clock cycles of the calibration/synchronization pulse shall be driven high, etc.), and/or the like.

Additionally, or alternatively, a requirement may include a requirement for a transmission property of a nibble pulse (e.g., a nibble may refer to a message with a particular quantity of bits, such as four bits), such as a requirement for a manner in which clock cycles of a nibble pulse are to be driven (e.g., X clock cycles of the nibble pulse shall be driven low, all remaining clock cycles of the nibble pulse shall be driven high, etc.), a requirement for a length of a pulse period (e.g., the minimum pulse period of the nibble pulse shall be X clock cycles, the maximum pulse period of the nibble pulse shall be Y clock cycles, etc.), and/or the like.

In some implementations, one or more hardware components of runtime monitor 220 may be programmed to analyze runtime system 210 based on a requirement (e.g., by implementing code on runtime monitor 220). In this way, a generic runtime monitor 220, capable of monitoring a variety of runtime systems 210, may be programmed to monitor a specific type of runtime system 210, thereby reducing costs by developing a single programmable runtime monitor rather than specifics runtime monitors for handling specific types of runtime systems. In some implementations, runtime monitor 220 may identify runtime system 210 and/or a type of runtime system 210 (e.g., an automotive system, a health care system, an avionics system, a security system, etc.), and may program runtime monitor 220 based on the runtime system 210 and/or the type of the runtime system 210. For example, the same requirement may be implemented differently to analyze different runtime systems 210 (e.g., using different code). In this case, runtime monitor 220 may determine the code to be implemented for the requirement based on the runtime system 210 and/or the type of the runtime system 210, and may implement the determined code.

As further shown in FIG. 5, process 500 may include receiving one or more signals from the system during the runtime operation of the system (block 520), analyzing the one or more signals during the runtime operation of the system using the one or more requirements (block 530), and determining, during the runtime operation of the system, whether a requirement has been violated (block 540). For example, runtime monitor 220 may receive one or more signals from runtime system 210 during a runtime operation of runtime system 210, and may analyze the one or signals according to the requirement(s). A signal may include, for example, an analog signal (e.g., a voltage, an electrical signal, an optical signal, etc.), a digital signal, a data output, and/or the like. In some implementations, runtime monitor 220 may receive tens, hundreds, thousands, millions, or more signals during a time period, and may be capable of processing such large volumes of signals.

Runtime monitor 220 may use the code translated from the requirements to analyze the signal(s) and determine whether a requirement is violated. For example, runtime monitor 220 may compare signal(s) to threshold value(s) determined based on the requirement(s), may compare differences between signals to threshold value(s) determined based on the requirement(s), may compare periods between signals to threshold value(s) determined based on the requirement(s), and/or the like. In some implementations, runtime monitor 220 may have a processing speed faster than the rate at which signals are received and/or sampled from runtime system 210, so that runtime monitor 220 can analyze the signal(s) in real-time to determine whether a requirement is violated during runtime of runtime system 210.

As further shown in FIG. 5, if a requirement has not been violated during the runtime operation of the system (block 540—NO), then process 500 may include returning to block 520 to continue receiving and analyzing signals. For example, runtime monitor 220 may continue to receive and analyze signals from runtime system 210 until a violation is detected.

As further shown in FIG. 5, if a requirement has been violated during the runtime operation of the system (block 540—YES), then process 500 may include determining a cause of one or more violations (block 550) and outputting log information and/or a signal that indicates one or more violated requirements and/or the cause of the one or more violations (block 560). For example, if runtime monitor 220 determines that a requirement has been violated, then runtime monitor 220 may determine a cause of the violation. The cause may indicate a reason why the requirement was violated. For example, if a requirement indicates that an acknowledgement must be detected not earlier than the next 5 clock cycles and not later than 20 clock cycles, the cause may indicate whether the acknowledgement was detected too early (e.g., before 5 clock cycles), too late (e.g., after 20 clock cycles), or not at all.

In some implementations, runtime monitor 220 may output log information to a user device for display. The log information may include an indication of the requirement that was violated, an indication of a cause of the violation, an indication of when the requirement was violated, an indication of a state of runtime system 210 before, during, and/or after the violation, and/or the like. In this way, an operator may take corrective action during runtime of runtime system 210.

Additionally, or alternatively, runtime monitor 220 may output an instruction to external equipment 250 based on the requirement violation and/or the cause of the requirement violation. External equipment 250 may perform additional monitoring of runtime system 210 based on the instruction. Additionally, or alternatively, external equipment 250 may output one or more control signals to control runtime system 210 based on the instruction (e.g., to modify a voltage, etc.).

Additionally, or alternatively, runtime monitor 220 may output an instruction to control runtime system 210 (e.g., to counteract the violation) based on the violation and/or the cause. In some implementations, the instruction may be determined based on a machine learning algorithm that analyzes historical operating characteristics of runtime system 210, historical instructions provided to runtime system 210, historical and/or similar violations, historical and/or similar causes, etc. Such information and machine learning may be used to determine an instruction with a likelihood of counteracting the violation. In this way, runtime monitor 220 may counteract a requirement violation, during runtime, that occurs on runtime system 210.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
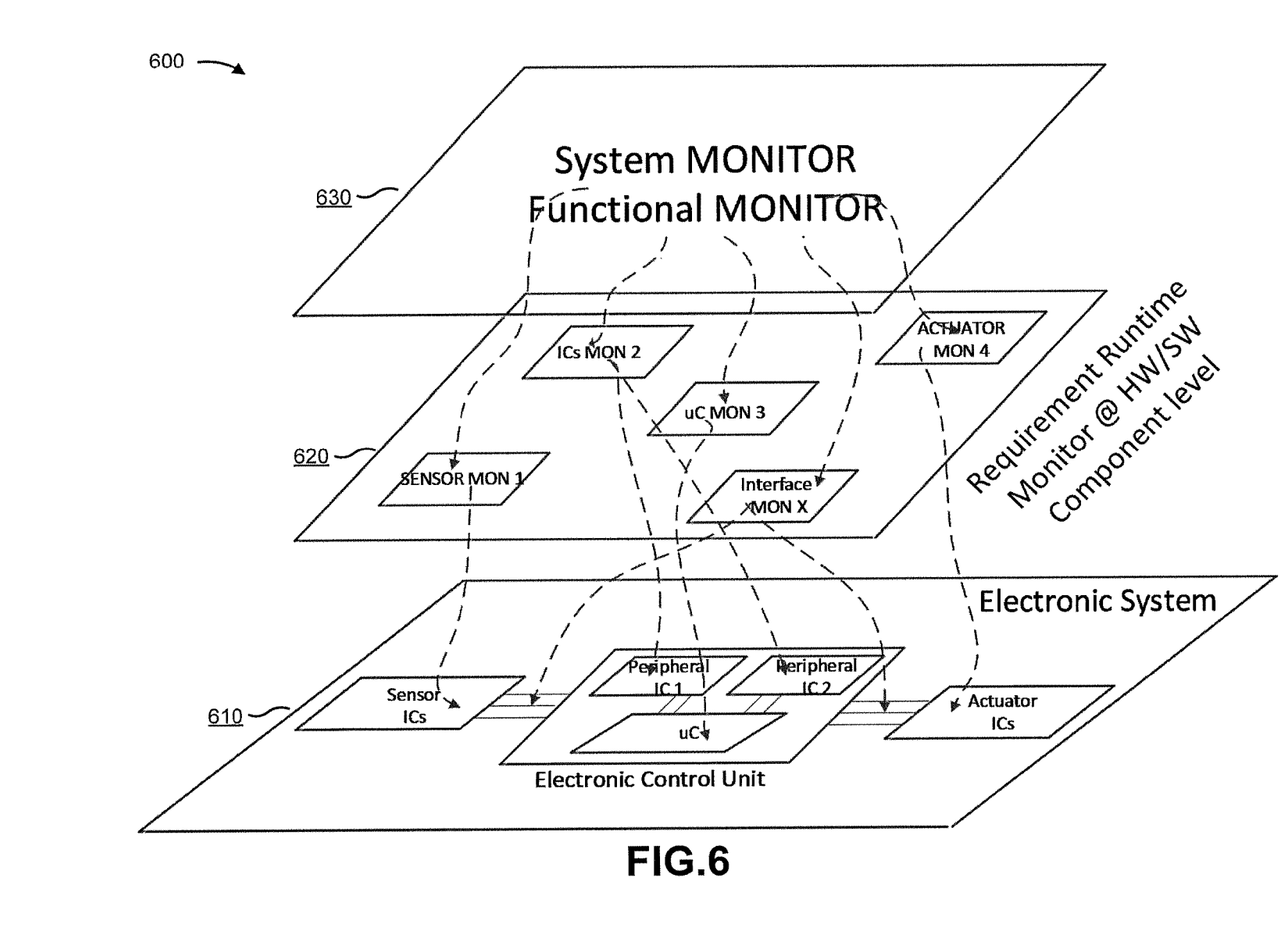
FIG. 6 is a diagram of an example implementation relating to the example process shown in FIG. 5.

FIG. 6 is a diagram of an example implementation 600 relating to example process 600 shown in FIG. 6. FIG. 6 shows an example distributed monitoring concept for monitoring hardware components and software modules for system and functional monitoring.

As shown in FIG. 6, an electronic system 610 (e.g., runtime system 210) may include one or more components, such as a sensor, a microcontroller, a first peripheral, a second peripheral, and an actuator. Two or more of these components may be connected by interfaces. As shown by reference number 620, multiple runtime monitors may be used at a low-level layer to monitor the components and/or interfaces, such as a runtime monitor to monitor the sensor, a runtime monitor to monitor the microcontroller, a runtime monitor to monitor the peripherals, a runtime monitor to monitor the actuator, and a runtime monitor to monitor the interfaces. As shown by reference number 630, another runtime monitor may be used at a high-level layer to monitor outputs from multiple runtime monitors at the low-level layer. In this way, many types of runtime requirements may be monitored, thereby improving system performance and safety.

As indicated above, FIG. 6 is provided as an example. Other examples are possible and may differ from what was described with regard to FIG. 6.

Implementations described herein permit accurate monitoring of a runtime system, thereby improving system performance, functional operation, and safety.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A hardware monitor, comprising:
one or more hardware components to:
  receive information that identifies a requirement for a hardware system,
    the requirement being associated with operation of the hardware system during a runtime operation of the hardware system in an intended operating environment;
  program the one or more hardware components to analyze the hardware system based on the requirement;
  receive a runtime signal, associated with a component of the hardware system, from the hardware system during the runtime operation of the hardware system in the intended operating environment;
  analyze the runtime signal during the runtime operation of the hardware system based on programming the one or more hardware components to analyze the hardware system;
  monitor another signal associated with a software module of the hardware system or another component of the hardware system;
  determine, during the runtime operation of the hardware system, that the requirement was violated during the runtime operation of the hardware system based on analyzing the runtime signal and the other signal; and
  output information indicating that the requirement was violated.

2. The hardware monitor of claim 1, where the one or more hardware components are further to:
  identify a cause of the requirement being violated; and
  where the one or more hardware components are further to:
    output information that identifies the cause.

3. The hardware monitor of claim 2, where the one or more hardware components include:
  a requirements runtime monitor component to monitor the runtime signal and determine that the requirement was violated; and
  a causality analysis component to identify the cause.

4. The hardware monitor of claim 1, where the requirement is associated with a hardware component of the hardware system, a software module of the hardware system, or a communication interface associated with two or more components of the hardware system.

5. The hardware monitor of claim 1, where the requirement is implemented as hardware code in the hardware monitor,
  the hardware code having been translated from temporal logic syntax or a regular expression.

6. The hardware monitor of claim 5, where the temporal logic syntax or the regular expression has been translated from a natural language requirement.

7. The hardware monitor of claim 1, where the hardware system includes a sensor, an electronic control unit, and an actuator.

8. A runtime monitor, comprising:
a memory; and
one or more processors to:
  receive information that identifies an intermediate time-based representation that expresses a requirement for a hardware system,
    the requirement being associated with operation of the hardware system during a runtime operation of the hardware system in an intended operating environment;
  store the requirement in the memory as code that represents the requirement;
  program the one or more processors to analyze the hardware system based on the requirement;
  receive a runtime signal from the hardware system during the runtime operation of the hardware system;
  analyze the runtime signal during the runtime operation of the hardware system based on programming the one or more processors to analyze the hardware system;
  monitor another signal associated with a software module of the hardware system;
  determine, during the runtime operation of the hardware system, that the requirement was violated during the runtime operation of the hardware system based on analyzing the runtime signal and the other signal; and
  output information indicating that the requirement was violated.

9. The runtime monitor of claim 8, where the runtime signal is an analog signal.

10. The runtime monitor of claim 8, where the requirement relates to an electrical interface of the hardware system.

11. The runtime monitor of claim 8, where the requirement relates to a transmission property of the hardware system.

12. The runtime monitor of claim 8, where the intermediate time-based representation is temporal logic or a regular expression.

13. The runtime monitor of claim 8, where the intermediate time-based representation is translated from a natural language requirement.

14. The runtime monitor of claim 8, where the one or more processors are further to:
  identify the hardware system or a type of the hardware system; and
  program the one or more processors to analyze the hardware system, using the requirement, based on the hardware system or the type of the hardware system.

15. A method, comprising:
receiving, by a hardware monitor, information that identifies a requirement for a hardware system,
   the requirement being associated with operation of the hardware system during a runtime operation of the hardware system in an intended operating environment,
   the requirement being translated from temporal logic or a regular expression to code implemented on the hardware monitor;
monitoring, by the hardware monitor, a runtime signal, associated with a component of the hardware system, from the hardware system during the runtime operation of the hardware system;
analyzing, by the hardware monitor, the runtime signal during the runtime operation of the hardware system using the requirement translated to code implemented on the hardware monitor;
monitoring another signal associated with another component of the hardware system;
determining, by the hardware monitor and during the runtime operation, that the requirement was violated during the runtime operation of the hardware system based on analyzing the runtime signal and the other signal; and
outputting, by the hardware monitor, information indicating that the requirement was violated.

16. The method of claim 15, further comprising:
determining a reason that the requirement was violated; and
outputting information that identifies the reason.

17. The method of claim 15, further comprising:
providing a control signal to the hardware system to counteract the requirement that was violated.

18. The method of claim 15,
where the runtime signal is a first signal;
where the other signal is a second signal; and
the method further comprising:
   monitoring a third signal associated with an interface of the hardware system; and
where determining that the requirement was violated comprises:
   determining that the requirement was violated based on the first signal, the second signal, and the third signal.

19. The method of claim 15, where outputting information indicating that the requirement was violated comprises:
providing the information indicating that the requirement was violated to a user device for display via a user interface associated with the user device.

20. The method of claim 15, further comprising:
determining, based on a machine learning algorithm, an instruction to counteract the requirement that was violated;
   the machine learning algorithm being based on at least one of:
      analyzing historical operating characteristics associated with the hardware system,
      analyzing historical instructions associated with the hardware system,
      analyzing historical violations associated with the hardware system, or
      analyzing historical causes of violations associated with the hardware system; and
providing the instruction to the hardware system to counteract the requirement that was violated.

* * * * *